Aug. 28, 1956    F. W. MARSHALL    2,760,614
CLUTCH
Filed July 26, 1952    3 Sheets-Sheet 1
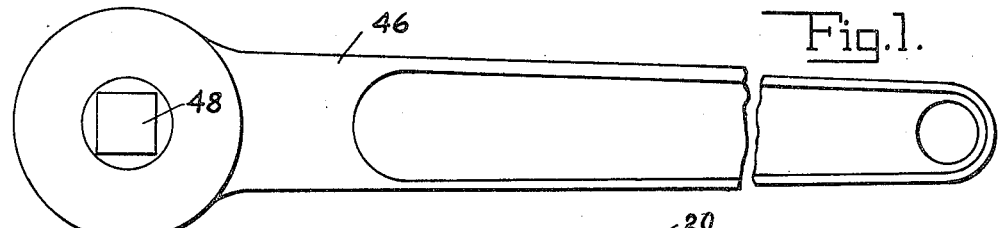
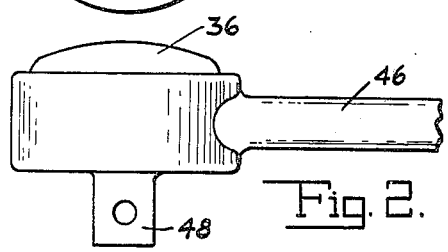
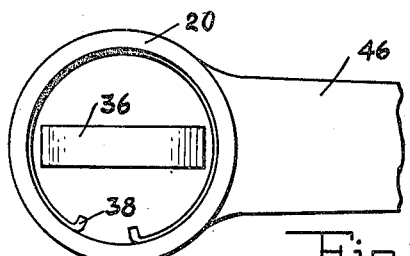
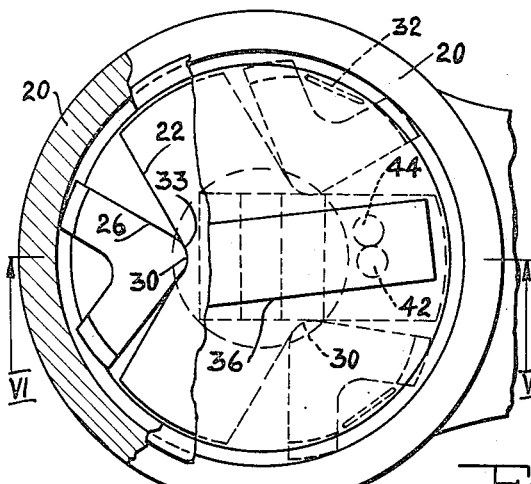
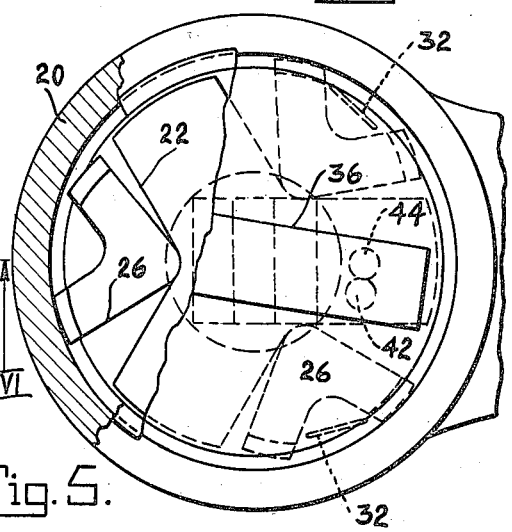
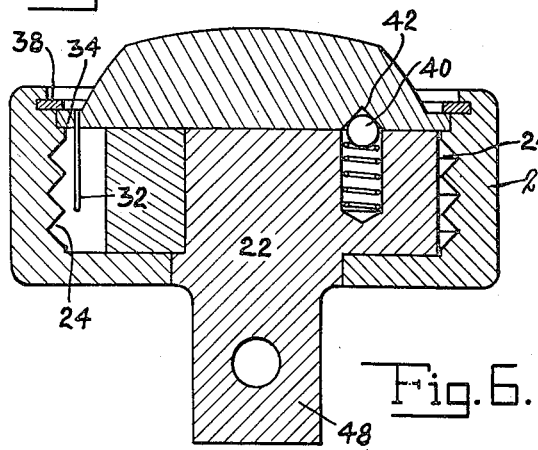
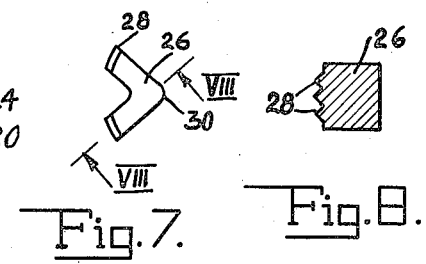
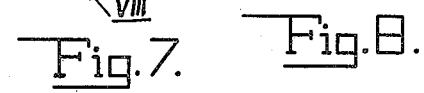
INVENTOR.
FRANKLIN W. MARSHALL
BY
Christy, Parmelee and Strickland
ATTORNEYS.

Aug. 28, 1956  F. W. MARSHALL  2,760,614
CLUTCH
Filed July 26, 1952  3 Sheets-Sheet 2

INVENTOR.
FRANKLIN W. MARSHALL
BY
Christy, Parmelee and Strickland
ATTORNEYS.

United States Patent Office 2,760,614
Patented Aug. 28, 1956

2,760,614

CLUTCH

Franklin W. Marshall, Pittsburgh, Pa., assignor to Tricon, Inc., Pittsburgh, Pa., a corporation of Pennsylvania Application July 26, 1952, Serial No. 301,028

6 Claims. (Cl. 192—43)

This invention relates to a clutch mechanism. More particularly, the invention relates to a clutch mechanism which may be used for firmly gripping and moving a member in either direction without lost motion. Such a mechanism is particularly useful for wrenches, drills, screw drivers, and for clutch driving purposes.

The present invention utilizes the principle of a toggle to cause a gripping of the clutch members. The toggle is quite commonly used in wrenches, clutches, brakes and the like to provide freedom of rotation in one direction, and a clutching or gripping of a member to be rotated in the opposite direction. The effectiveness of the clutching or gripping hold of one member or another depends upon the shape and arrangement of the surface of the contacting parts. A point contact between two surfaces is not desirable because the toggle action will tend to score or cut the surface of the member to be driven. With tools, such as wrenches, drills and screw drivers, a comparatively small clutching surface is available, and therefore such toggle-operated clutches often slip or score, and give unsatisfactory operation.

The primary object of the present invention is to provide a toggle clutch mechanism for positively clutching and driving a member.

Another object of the invention is to provide a toggle clutch mechanism for gripping and moving a member in either direction, and which will allow free movement of the member in the direction opposite from that in which the toggle is set to grip a member.

A further object of the invention is to provide a toggle clutch mechanism in which the clutching action involves the wedging of one surface against another, as well as the frictional gripping of the surfaces of the two members.

A still further object of the invention is to provide a clutch mechanism utilizing a planetary arrangement of three or more toggles to distribute and increase the frictional clutching operation.

With these and other objects in view, the invention consists in the improved toggle clutch mechanism as hereinafter illustrated and described and more particularly defined in the appended claims.

The various features of the invention are illustrated in the accompanying drawings, in which:

Fig. 1 is a bottom plan view of a socket wrench in which a preferred form of the invention is embodied;

Fig. 2 is a side elevation of the wrench shown in Fig. 1 with part of the handle omitted;

Fig. 3 is a top plan view of the wrench of Fig. 2;

Fig. 4 is an enlarged plan view with parts in section showing the toggle gripping parts in position for moving the driven member in a counter-clockwise direction;

Fig. 5 is a view similar to the view of Fig. 4, in which the toggle gripping parts are arranged to move the driven member in a clockwise direction;

Fig. 6 is a vertical sectional view of the wrench taken on the line VI—VI of Fig. 4;

Fig. 7 is a top plan view of the toggle gripping shoe of the wrench;

Fig. 8 is a vertical sectional view of the toggle gripping shoe taken on the line VIII—VIII of Fig. 7;

Figure 9:
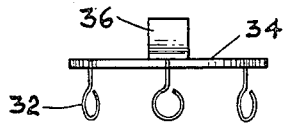
Fig. 9 is a view in side elevation.
Figure 10:
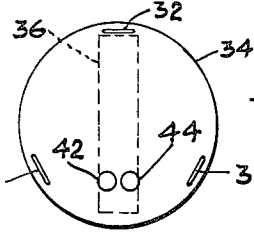
Fig. 10 is a bottom plan view of the toggle reversing plate of the wrench.
Figure 11:
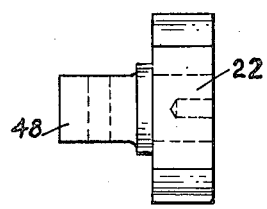
Fig. 11 is a view in side elevation.
Figure 12:
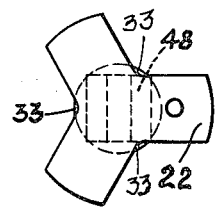
Fig. 12 is a top plan view of the toggle cam member of the wrench.

The embodiment of the invention is in the form of a toggle wrench as illustrated in Figs. 1 to 12 inclusive. The wrench is composed of two parts, an outer tubular member 20 and an inner toggle cam member 22. As illustrated in Figs. 4, 5 and 6, the outer member 20 has a series of V-shaped or U-shaped grooves 24 therein with which the toggle shoes 26 cooperate to provide the gripping or clutching action when the toggles are operated by the toggle cams 22. The toggle shoes 26 are illustrated more particularly in Figs. 4, 5 and 7 and consist of a U-shaped member having U-shaped or V-shaped teeth 28 on the ends of each arm of the U which are arranged to cooperate and mesh with the U-shaped grooves 24 in the member 20. The back face of the toggle shoe is rounded at 30, which is arranged to coact with a rounded face 33 between arms of the toggle member 22. The shape of each arm of the toggle shoe is such that when the toggle shoe is oscillated by movement of the toggle member 22, the teeth 28 will be wedged into the grooves 24 and at the same time the faces or sides of the teeth 28 will have a frictional grip on the faces or sides of the grooves 24. The total surface of the teeth which contact the faces or sides of the grooves give an extended frictional surface for forming a clutching grip between the members 20 and 22. As illustrated in Figs. 4 and 5, when one arm of the toggle shoe is in clutching position in the grooves 24, the other arm of the toggle shoe is withdrawn from the grooves 24 and will allow a free movement between the members 20 and 22 in a direction opposite to that for which the toggle is set to clutch the two members.

The design of the toggle shoe 26 forms an important feature of the present invention. As illustrated in Figs. 6 and 8, the toggle shoe has three teeth 28 which engage three grooves 24 in the member 20. One to six grooves 24 and teeth 28 will be used in the clutch in accordance with the load to be placed on the clutch. With the usual form of wrenches, three grooves 24 and teeth 28 are preferably used.

Figure 20:
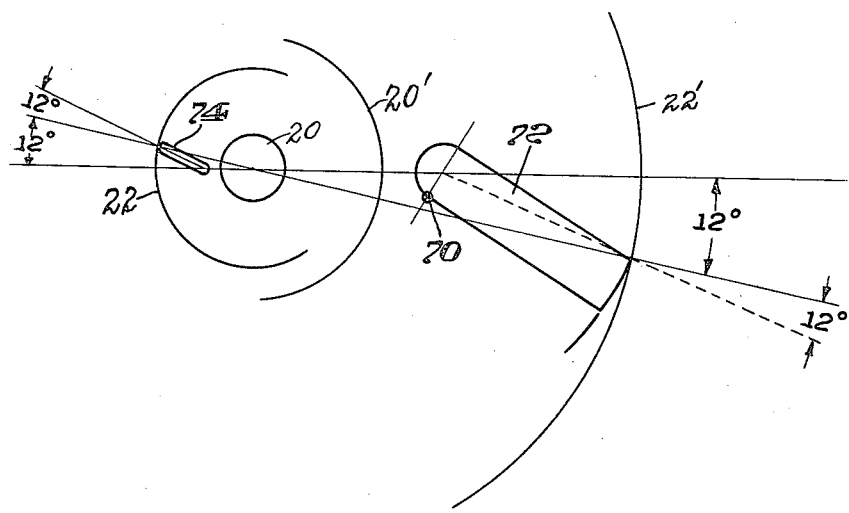
Fig. 20 is a diagrammatic illustration of the formula used in the design of the double acting toggle shoe used in the clutch of the present invention.

Referring to Fig. 20, it will be seen that for the usual clutch construction, an angle of 12° is preferred for the angle of contact of toggle shoe teeth with the grooves in the driven member 22. Experience has shown that the angle of contact may be varied between 5° and 17°. If the angle of contact is 4°, the toggle shoe will often lock against the driven member and if the angle of contact is 18° the shoe will slip in the groove under a heavy load.

The clutching action involves two thrusts, a torsional thrust and a radial thrust. The torsional thrust is equal to the force applied by the driving member times the ratio of leverages of toggle or driven member 22 to the effective lever length of the driving member 20 with its handle 46. The radial thrust is equal to the torsional thrust times the cotangent of the contact angle of the toggle shoe with the driven member. With these two thrusts known, the toggle shoe may be designed to provide for any desired clutching action. As the angle of contact of the toggle shoe 26 with the member 20 decreases, the cotangent increases and thus increases the radial thrust.

Further, the tensile strength of the steel used in making the driven member 22 and the wall thickness of the driving member will depend upon the load to be applied to the driven member.

The diagram of Fig. 20 shows that for the preferred design of the toggle shoe, the bearing radius should be established half-way between the center of the toggle member 22 and the inside diameter of the driven member. The apparatus being designed, however, may require that the bearing radius must be longer or shorter than the preferred radius.

Another important feature in the design of the toggle shoe is the curvature of the contact face of the toggle shoe which engages the grooves in the driven member. By using the point 70, Fig. 20, as a center, the curvature of contact face of the toggle shoe is produced. This curvature will compensate for wear of the shoe and driven member and at the same time maintain constant the angle of contact of the shoe with the face of the driven member. The center 70 is the point of intersection of a line through the pivotal center of a simple toggle shoe 72, at right angles to the longitudinal axis of the toggle shoe, with the back edge of the shoe.

The toggle shoe 26 and toggle member 22 may be made as precision castings and finished by grinding to provide parts that will give no lost motion in operation.

The clutching action of the toggle shoes 26 is a friction gripping caused by an outward thrust and the friction becomes additive as the toggle is forced against the driven member. This clutching action will depend upon the bearing radius, the angle of contact of toggle shoe with the inside face of the driven member and the pitch of the teeth in toggle shoe and the driven member. As the tooth pitch increases the gripping surface of the teeth increases. The engagement of the teeth of the toggle shoe with the grooves of the driving member provides a very large gripping surface and the distribution of the three shoes in the clutch equalizes the thrust on the driven member.

Fig. 20 illustrates the design of two simple toggle shoes 72 and 74 for two different sizes of clutches using a 12° angle of contact face of the toggle shoe with the inside face of the driven member. The toggle shoe 72 grips to the driving member 22' to drive the driven member having a shaft 20'. The small toggle shoe 74 grips on the driving member 22 to drive the driven member having a shaft 20.

As illustrated in Figs. 4, 5 and 6, three toggle shoes are arranged in a planetary position within the member 20 and around the member 22. The toggle shoes are all of similar shape and dimension so that when a relative movement is made between the members 20 and 22, all of the toggle shoes will simultaneously grip or clutch the member 20 to cause a simultaneous movement of the members 20 and 22. It will be seen that the angular arrangement of the arms of the gripping shoe is such that when there is relative rotational movement between the members 20 and 22, the toggle shoe will be moved into gripping position. If the relative movement between the members 20 and 22 is in opposite direction from that of the gripping action, then the toggle shoes will be released from the member 20 and allow a free rotating movement in the released position.

The toggle shoes may be oscillated within the triangular segments formed in the toggle member 22 to bring first one arm into position for gripipng the member 20, or the other arm into position for gripping the member 20. When one arm of the toggle shoe is in position to grip the member 20, the other arm is released from the member 20. By this arrangement the clutching action between the members 20 and 22 may be reversed so that the members 20 and 22 may be gripped to move in either clockwise or counter-clockwise direction, while at the same time the members will be free to move in a counter-clockwise and clockwise direction respectively. To shift the setting of the gripping shoes, a spring loop 32 is positioned within the U of the toggle shoe (Figs. 4 and 5), there being a loop for each toggle of the planetary group. The loops 32 are mounted in a clutch plate 34 which is provided with a handle 36. The clutch plate is mounted above the toggle member 22, and is held in position on the toggle member by means of a retaining ring 38 (Fig. 3). A spring-pressed ball 40 is mounted in the toggle member 22 in a position to enter into a cavity in the plate 34. As illustrated in Figs. 4 and 5, cavities 42 and 44 are mounted in the plate 34 by which the clutch shoe may be positively held in adjusted position to set the clutching mechanism for operation in either direction.

As illustrated in Figs. 1, 2, 3 and 6, a handle 46 is welded or formed integral with the member 20 so that the member 20 is the driving member for the clutch. A square shank 48 is formed on the bottom of the toggle member 22, which may be attached to any member to be driven, and therefore the toggle member 22 of the wrench is the driven member.

In Figs. 13 to 19 inclusive is illustrated a clutch adapter which is not provided with a handle, but which has a socket and a shank to which a handle may be attached so that either member of the clutch may be a driven member or a driving member.

Figure 14:
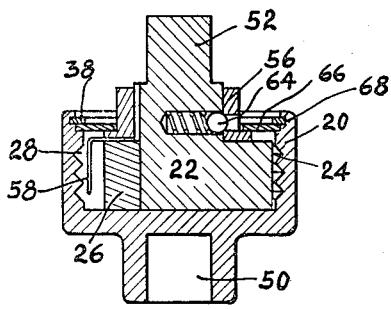
Fig. 14 is a vertical sectional view of the adapter shown in Fig. 13.
Figure 13:
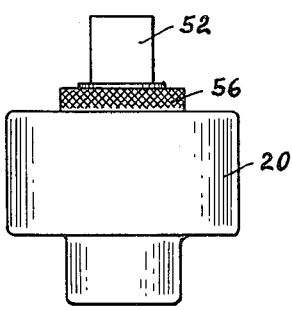
Fig. 13 is a view in side elevation of a clutch or wrench adapter for use with different kinds of handles.
Figure 15:
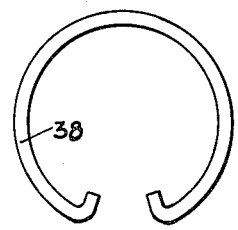
Fig. 15 is a retaining ring for holding the parts of the adapter clutch in assembled position.
Figures 16, 17:
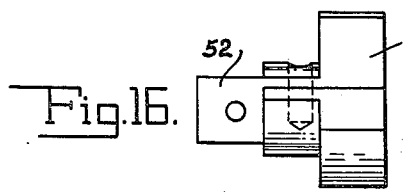
Fig. 16 is a side elevation.
Fig. 17 is a bottom plan view of the toggle cam member of the adapter of Fig. 14.
Figure 18:
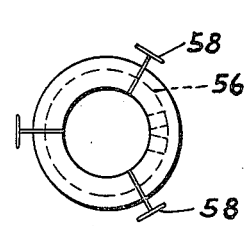
Fig. 18 is a bottom plan view.
Figure 19:
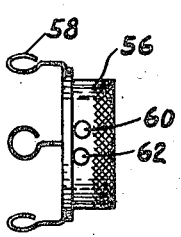
Fig. 19 is a view in side elevation of the reversing sleeve for the toggle shoes of the adapter.

Referring to Fig. 14, the outer member 20 is provided with the circular grooves 24 and the toggle member 22 is arranged to drive toggle shoes 26 having teeth 28 which engage the grooves 24. A socket 50 is formed on the bottom of the member 22 and a square shank 52 is secured to the top of the toggle member 22. As illustrated in Figs. 16 and 17, the toggle member 22 is made up of three arms having a cam face 54 at the apex of the angle of each pair of arms which is arranged to cooperate with the back face of a toggle shoe having the same shape and arrangement as illustrated in Figs. 7 and 8.

The clutch reversing mechanism consists of a sleeve 56 which carries three wire loops 58 (Figs. 18 and 19) arranged to fit within the angle of the toggle shoes 26. The sleeve 56 is provided with openings 60 and 62 which are arranged to engage a spring-pressed detent ball 64 mounted in the toggle member 22. A plate 66 is mounted above a flange on the sleeve 56 and engages a shoulder on the inside of the member 20 for holding the clutch sleeve in position on the toggle member 22. A spring detent 38 (Figs. 14 and 15) is used to engage a slot 68 in the member 20 to hold the parts in assembled position.

It will be apparent from the construction outlined above that either the member 20 or 22 may be a driven member or a driving member in accordance to which member the power is applied.

If either of the clutch members illustrated in the drawings is used to give rotation always in one direction, the clutch member may be set in one position in accordance with the direction in which the member is to be rotated, and the clutch member would not thereafter be used. Such an arrangement is suitable for example for operating a bicycle coaster brake, a shaft coupling, a lawn mower, a conveyor belt, a starter motor, a typewriter spacer, a forced feed lubricator, and many other applications.

If it is desired to use the reversible clutching mechanism for operation in either direction, then the clutching member will be used in accordance with the direction in which rotation is desired, and such a mechanism is well adapted for socket wrenches, speed wrenches, carpenter bit braces, offset screw drivers, machine tool feed mechanism, vises, and clamping handles.

It will be seen that the toggle mechanism employed in the present invention is self-compensating for wear and cannot lock or slip. Furthermore, there is no lost motion or back-lash in the clutching operation. The gripping action is very powerful and positive, in view of the fact that it has the wedging action, as well as the frictional gripping action.

In the claims the grooves 24 are described as V-shaped. It is to be understood that the term V-shaped groove is inclusive of a U-shaped groove.

This application is a continuation-in-part of my application Serial No. 219,917, filed April 9, 1951, for a Clutch.

The preferred form of the invention having thus been described, what is claimed as new is:

1. A friction clutch mechanism comprising an annular first member having a V-shaped circular groove in the inside face thereof, a toggle shoe pivoted within the first member having a V-shaped tooth arranged to make a friction contact with the groove of the first member, and a second member movably mounted within the first member having a cam face engaging the end of the shoe opposite the tooth arranged to rotate the tooth outwardly into the groove upon movement of the second member relatively to the movement of the first member for gripping and moving one member when the other member is driven, the faces of the toggle shoe for contacting the V groove have a curvature arranged to move angularly across the faces of the V groove for clutch gripping the first member with the toggle shoe.

2. The mechanism defined in claim 1 in which the toggle shoe has a set of V-shaped teeth mounted on each of two separated arms of the shoe arranged in a U shape, the shape and arrangement of the arms being such that with the back of the shoe against the cam on the second member, one set of teeth will engage the grooves of the first member when the other set of teeth will stand withdrawn from the grooves, and vice versa, and manually operated means for shifting the shoe so that the teeth of either arm of the shoe will engage the grooves in the first member whereby the gripping action of the clutch may be reversed.

3. The mechanism defined in claim 2 in which a plurality of U-shaped toggle shoes have a planetary arrangement within the first member, and a cam face is formed on the second member to engage the back of each toggle shoe, the face being arranged to force all of the toggle shoes into gripping contact with the grooves of the first member simultaneously.

4. A friction clutch comprising an outer annular member having a V-shaped circular groove therein, a toggle shoe pivoted with a fixed axis within said member having a V-shaped tooth arranged to make a friction contact with the groove of the outer member, and a second member positioned within the outer member having a cam face arranged to engage the toggle shoe and rotate the tooth outwardly into the groove for gripping and moving one member when the other member is being driven, the sides of the groove engaging face of the toggle having a curvature in the line of movement for gripping the outer member formed about an axis offset from the pivotal axis of the toggle shoe about one-half the width of the toggle shoe on a line extending through said toggle shoe pivot axis at right angles to a line extending from said toggle pivot axis to the center of the toggle shoe at the tooth end thereof, said curvature being shaped and arranged to maintain principal points of contact with the opposite sides of the groove at a uniform angle relation to a line passing through the axis of the outer member and the pivotal axis of the toggle irrespective of the wear on the toggle tooth and groove.

5. The clutch mechanism defined in claim 4 in which the angle of contact of the toggle shoe with the inner face of the driven member is an angle between 4° and 18°, preferably 12°.

6. The clutch mechanism defined in claim 1 in which the toggle shoe rotates about an axis which is located on a radius of the outer member approximately half way between the radius center and the inner face of the outer member.

References Cited in the file of this patent

UNITED STATES PATENTS

| | | |
|---|---|---|
| 531,577 | Teal | Dec. 25, 1894 |
| 1,912,407 | Sahli | June 6, 1933 |
| 2,138,331 | Ward | Nov. 29, 1933 |
| 2,554,990 | Kilness | May 29, 1951 |

FOREIGN PATENTS

| | | |
|---|---|---|
| 313,508 | Germany | Jan. 2, 1929 |